United States Patent Office 3,249,175
Patented May 3, 1966

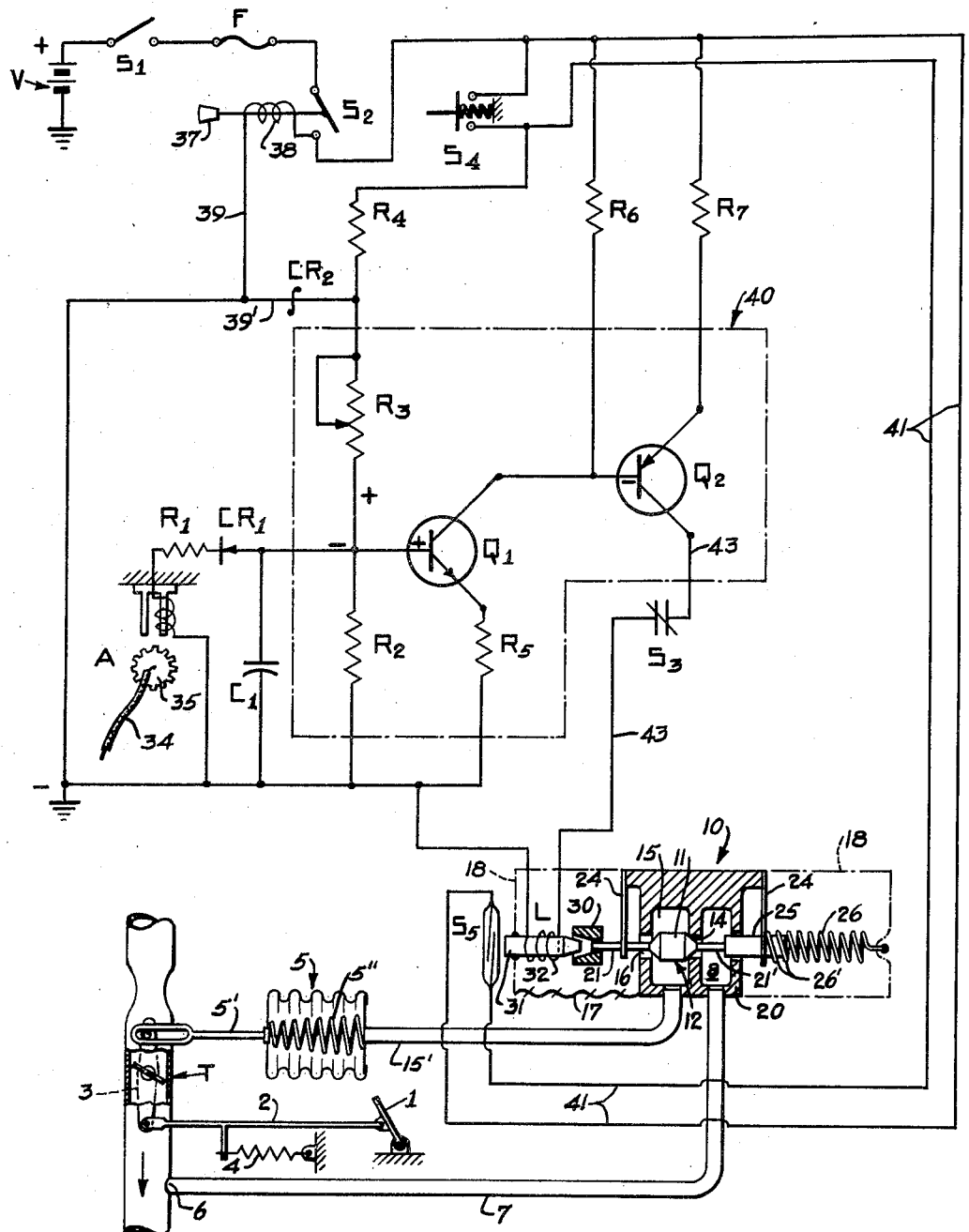

3,249,175
SPEED REGULATING MECHANISMS
Donald J. Baxter, South Euclid, Ohio, assignor to Curtiss-Wright Corporation, a corporation of Delaware
Filed Apr. 22, 1964, Ser. No. 361,683
2 Claims. (Cl. 180—82.1)

My invention relates to mechanisms adapted for automatically controlling the speed of an engine, particularly that of a motor vehicle, to maintain desired vehicle speeds substantially independently of changes in road gradient or load.

An object of the invention is to provide a novel, simple and inexpensive electronic system and apparatus for automatically controlling a self-stabilizing, fluid-pressure-operated servomechanism to govern engine speed.

A specific object is to provide an improved engine control system operating through a servomechanism actuated or powered by engine-generated vacuum wherein an extremely simple and inexpensive combination of solid state electronic units of already proven effectuality and practicality can be used to produce the necessary engine control (e.g., fuel control) operations, with minimum required attention by the vehicle operator or driver and with adequate fail-safe protection in event of unexpected deviations in electric current supply.

Other objects will be explained or will become apparent from the following description of a presently-preferred and herewith schematically illustrated arrangement of interrelated components constituting the improved control apparatus in one form as shown in the accompanying drawing.

Assuming the invention is being applied to present day automotive equipment and for vehicle-road speed regulation (for example as in U.S. Patent 3,023,828 issued March 6, 1962), a speed control member of the engine (represented herein by a throttle valve T) is arranged for conventional operation by the driver via an accelerator pedal 1, linkage 2 and throttle-connected lever 3 to increase fuel to the engine as the accelerator pedal is depressed. The accelerator, as is usual, has a return or biasing spring means 4 tending to move the throttle to its illustrated idling position.

Automatic governing operation via the herewith-illustrated engine speed control system, subject to initiation by the driver as will be explained, is accomplished by a servomotor (or servo) 5 in an operating fluid pressure circuit as will be described and having a one-way-operating connection 5' (pull only) with the throttle valve linkage. Servo 5 is shown as a suction-operated flexible bellows or diaphragm biased by a loading spring 5" in a direction to permit the throttle to be closed to the illustrated idling position in respect to the engine by the means already referred to and as apparent from inspection of the drawing.

The servo 5 is operated by engine vacuum, tapped downstream from the carburetor as at 6 by duct 7 and connected through a vacuum chamber 8 of a modulating valve assembly or pilot valve mechanism 10 for exposure in or to the servo 5 whenever the valve plug element 11 of a pilot valve plunger assembly 12 (hereinafter pilot valve 12) is moved to open a valve port 14 connected, as via a duct or passage 15' (e.g., through an air chamber 15 of a valve body 20) to the operating chamber of the servo 5.

For illustrative purposes all pilot-valve-associated portions of the present control apparatus are greatly exaggerated, i.e., out of proportion especially in respect to all other mechanical components which are generally larger but which are also shown greatly out of scale. The entire pilot valve unit 10, including transducer L described later, weighs only a few ounces.

As the valve plug 11 of pilot valve mechanism 10 is moved leftwardly (preferably forwardly of vehicle driving direction for minimum undesirable inertia effect) it variably restricts a port 16 leading to atmosphere, as through a suitable filter 17 in a housing 18 surrounding the valve body 20. If desired or if necessary the pilot valve can have suitable damping means, preferably a pneumatic (e.g., carbon piston in a glass cylinder) dashpot of known form which is practically frictionless.

In order to minimize friction such as could interfere with adequately rapid or precise movement of the pilot valve 12 in response to small forces of speed change signals (to be explained) the pilot valve, via its stem portion 21, is supported for example by a pair of flexible cantilever leaf springs 24, as well known in the governor art, fixedly attached to the valve body 20 by suitable means not shown.

Pilot valve plug 11 is illustrated in an "off" position in which port 14 is closed and the working chamber of servo 5 is vented to atmosphere through pilot valve port 16. The servo-biasing spring 5" can then move the link 5' to its illustrated non-working position wherein the servo 5 cannot interfere with conventional throttle control by the driver of the vehicle. In order substantially to balance or nullify suction "forces" axially on the pilot valve plug 11, which otherwise would tend strongly to stay in its illustrated position closing port 14, a stem portion 21' of the pilot valve is provided with a compensating piston 25 in close clearance relationship with a coaxial bore through an adjacent wall of valve chamber 8 approximately equal in diameter to valve port 14. The pilot valve 12, as shown, is biased lightly to the closed position in respect to port 14 as by a tension spring 26 preferably having means to adjust its valve-biasing force. For example, coils 26' at one end of the spring can in effect be screw threaded as to the stem-end portion of the pilot valve assembly 12.

The solid state electronic control apparatus hereof, as shown, includes the transducer L which preferably is a solenoid assembly including for example a desirably very lightweight armature member 30 connected with or supported by the pilot valve stem 21, a soft iron or equivalent stationary field or core piece 31, and a coil 32. The armature and core piece 31 preferably have adjacent tapered (frusto-conical) coaxial surfaces of known form, as suggested, or such that movement of the pilot valve 12 will be substantially or approximately proportional to changes in current in coil 32 throughout the entire range of governing operation.

To provide appropriate speed signals (e.g. vehicle speed), rotor 35 of a very small alternator A (variable reluctance type generator as schematically illustrated) is driven as by a flexible shaft assembly 34 (e.g., speedometer drive shaft) coupled with an output element of the vehicle transmission assembly not shown. The output of alternator A would be measured in microvolts, hence operation requires only a small fraction of the torque required to drive a centrifugal liquid pressure generator such as shown for example in U.S. Patent 2,990,825 (e.g., FIG. 2 thereof) as a vehicle-speed-signal producing means.

In the present control system, as will be shown, electrical energy is taken from a positive terminal of the automobile electrical power system, represented on the drawing by battery V and ignition switch $S_1$; and an accurately limited portion thereof, as reference voltage, is modified by suitably filtered D.C. output of alternator A, and is amplified sufficiently and adequately to actuate the small transducer L, whereby steadily to control operating fluid to the servo 5 by positioning and/or prompt repositioning of the pilot valve 12 as required by load change.

Conditionally to energize the electronic control system hereof a magnetically-locked-in "make-ready" switch $S_2$ in series with ignition switch $S_1$ via a protective fuse F, is closed by manipulation of a knob 37 at the driver's station. Holding coil 38 of switch $S_2$ as shown is connected to ground via line 39.

Push-button type switch (hereinafter "resume speed" button $S_4$) when closed momentarily by the driver, complements energization of the input side or portion of the amplifier network 40 via circuit portion 41 and resistance element $R_4$ to the extent of enabling energization of coil 32 of the transducer L, hence subjection of the servo 5 to engine manifold vacuum, and further opening of the throttle valve T. The amount of opening movement of the throttle valve at a predetermined engine load will be limited by the adjustment of the speed selecting rheostat $R_3$.

Circuit portion 41, once energized, becomes a holding circuit maintaining positive potential through the resistance of rheostat $R_3$ at the input of transistor $Q_1$. The "holding" results from energization of transducer L and magnetically-accomplished closing of associated switch $S_5$ which is preferably a gas (e.g., hydrogen) filled capsule containing switch contacts which are normally held open by contact-supporting very light spring force (magnetic reed switch). The "resume speed" button switch $S_4$ can, if desired, through appropriate interlinkage not shown, be closed simultaneously with "make-ready" switch $S_2$, but usually it is closed later, fully energizing the entire present control system.

Positive polarity D.C. energy from battery V is admitted, via make-ready switch $S_2$, to circuit portion 39'; and, via a zener diode $CR_2$ (or an operatingly, equivalent solid state thermionic valve which can act in a manner analogously to a spring loaded pressure-regulating valve in a pressure fluid circuit) a definitely limited but substantial portion of the battery output at positive polarity is admitted to the input side or base of an NPN voltage-amplifying transistor $Q_1$. The collector of transistor $Q_1$, as shown, is connected to the base of a second (PNP) transistor $Q_2$ whose positive polarity output, via conductor 43, is connected to one end of the coil 32 of transducer L, whereas the other end of that coil is connected to ground. The transistors $Q_1$ and $Q_2$ are in effect cascade-connected for amplification of signal current to energize the transducer L at the necessary gain for leftward or vacuum-port-opening operation of the pilot valve 12 against the selected and/or adjusted restraining influence of the biasing or reference spring 26.

The reference voltage admitted to the amplifying unit or circuitry 40 through a zener diode $CR_2$ at fixed values as described above is adjusted, as by a rheostat or potentiometer $R_3$ (rotary type coaxial with knob 37 for example—not shown) so as to be adequate to cause movement of the pilot valve 12 to whatever open position in respect to valve port 14 will stabilize engine speed at a value to produce and maintain the desired vehicle speed.

The alternating current output of the speed-sensing electrical generator A, via suitable resistor $R_1$, is rectified as at a solid state rectifier $CR_1$ and filtered conventionally as by capacitor $C_1$ (e.g., polarized electrolytic condenser) so as to maintain subtractive D.C. negative potential in modifying relationship to the reference voltage output of rheostate or potentiometer $R_3$. Additional more or less conventional electrical components in the illustrated circuit portions may include zener-diode-protecting resistance $R_4$, temperature compensating resistance units $R_6$ and $R_7$, and the balancing and/or biasing resistance units $R_2$ and $R_5$.

In order to deenergize all portions of the automatic control circuits and to return control of the engine to the operator via accelerator pedal 1 at desired times a normally closed switch $S_3$ in the transducer-connected circuit portion 43 is opened by vehicle brake or clutch operation, thereby enabling opening of the magnetic reed switch $S_5$ and cutting off of battery current supply to the amplifier network 40. The make-ready switch $S_2$ remains closed, so that closing of push-button switch $S_4$ can immediately reactivate the control system; but the entire circuitry is deenergized at engine shutdown operation (e.g., opening of ignition switch $S_1$).

Assuming that the operator-selected setting of rheostat $R_3$ which can easily be calibrated to correspond to actual speeds (linear) is such that the vehicle speed will be stabilized at 50 m.p.h. on level roadways, it is then only necessary, in order to maintain the set speed, to modify the current to which the transducer L becomes subjected as the effective load (going uphill or downhill) becomes varied. The negative output of alternator A (proportional to vehicle speed) diminishes the adjusted reference positive input of the transistor $Q_1$, hence the output to transducer L, proportionally to whatever amount the vehicle speed may be departing upwardly from "set" speed, whereby the pilot valve 12 is enabled to move toward closing position in port 14 to allow reduced fuel movement of the throttle. During deceleration, below set speed in response to load change, an opposite action to that described above occurs approximately proportionally to the amount of departure or error, i.e., higher current in transducer coil 32 and opening of valve port 14 to enable further opening of the engine throttle increased vacuum in the chamber of servo 5.

Stabilizing drop in speed with increase in load (and vice versa) occurs inherently in the control system hereof because, e.g., any change in the position of the pilot valve to increase or decrease fuel to the engine produces increased or decreased resistance by the biasing spring 5''. It will be evident that in event of electric power failure while the engine is under governor control immediate shutdown of the engine will occur.

While only one form of the device incorporating the features of the invention has been shown, it will be apparent that various changes and modification may be made therein by those skilled in the art without departing from the spirit and scope of the invention as set forth in the appended claims.

I claim:
1. In a motor vehicle engine governing system, the combination comprising:
   actuating means for moving the engine throttle to regulate vehicle speed;
   an electromagnetically operable valve operably connected with the actuating means for controlling the operation thereof;
   electromagnetic means at the valve for operating the valve;
   circuitry for controlling the operation of said electromagnetic means including a battery, an alternator, circuit means operably connected with the battery for producing an electric signal of one polarity to represent a preselected speed for the vehicle, other circuit means operably connected with the alternator for producing a uni-directional signal of opposite polarity having a magnitude at least approximately proportional to vehicle speed, amplifying means operably connected to each of said circuit means and said electromagnetic means for producing an amplified signal to control the electromagnetic means, switch means operable to initiate control of the electromagnetic means by said circuitry; and a holding circuit for maintaining control of the electromagnetic valve operating means by the said circuitry after the operation of said switch means, such holding circuit including contact means operably connected with the electromagnetic valve operating means to render the holding circuit effective upon operation of the electromagnetic means and valve in response to said amplified signal.

2. The combination of claim 1 including a brake-operated switch actuable to effectively disconnect the electromagnetic valve operating means from the control circuitry and thereby cause the contact means in the holding circuit to render said holding circuit ineffective.

References Cited by the Examiner
UNITED STATES PATENTS

| 2,835,237 | 5/1958 | Thorner | 123—102 |
| 3,049,110 | 8/1962 | Kerr | 123—102 |
| 3,070,185 | 12/1962 | Fales | 180—82.1 |
| 3,116,807 | 1/1964 | Wilson | 180—82.1 |

A. HARRY LEVY, *Primary Examiner.*

BENJAMIN HERSH, *Examiner.*

E. E. PORTER, *Assistant Examiner.*